(12) United States Patent
Hummel (10) Patent No.: US 8,453,514 B2
(45) Date of Patent: Jun. 4, 2013

(54) METHOD AND DEVICE FOR ASCERTAINING THE DEFORMATION OF A FUEL ASSEMBLY IN A PRESSURIZED-WATER REACTOR

(75) Inventor: Wolfgang Hummel, Neumarkt (DE)

(73) Assignee: Areva GmbH, Erlangen (DE)

( * ) Notice: Subject to any disclaimer, the term of this patent is extended or adjusted under 35 U.S.C. 154(b) by 0 days.

(21) Appl. No.: 13/470,468

(22) Filed: May 14, 2012

(65) Prior Publication Data

US 2012/0222489 A1 Sep. 6, 2012

Related U.S. Application Data

(63) Continuation of application No. PCT/EP2010/067073, filed on Nov. 9, 2010.

(30) Foreign Application Priority Data

Nov. 12, 2009 (DE) .......................... 10 2009 046 665
Dec. 9, 2009 (DE) .......................... 10 2009 047 760

(51) Int. Cl.
*G01B 7/16* (2006.01)

(52) U.S. Cl.
USPC ............................................. 73/779; 73/625

(58) Field of Classification Search
USPC ................................................... 73/625, 779
See application file for complete search history.

(56) References Cited

U.S. PATENT DOCUMENTS

| 5,027,522 A | | 7/1991 | Cagan et al. |
| 5,661,766 A | * | 8/1997 | McClelland et al. .......... 376/245 |
| 5,835,547 A | * | 11/1998 | Bour et al. .................... 376/248 |
| 5,852,642 A | | 12/1998 | Descot et al. |

(Continued)

FOREIGN PATENT DOCUMENTS

| DE | 247 064 A1 | 6/1987 |
| DE | 39 42 279 A1 | 7/1990 |

(Continued)

OTHER PUBLICATIONS

Ermolaev, et al., "Piezoelectric Probes for Measuring the Curvature of Nuclear Reactor Fuel Channels", translated from Ismeritel'naya Tekhnika, Measurement Techniques, 1993, pp. 819-820, vol. 36, No. 7, Springer, New York Issn: 0543-1972.

(Continued)

*Primary Examiner* — Freddi Kirkland, III
(74) *Attorney, Agent, or Firm* — Laurence A. Greenberg; Werner H. Stemer; Ralph E. Locher (57) ABSTRACT

A method and a device measure for a deformation of a fuel element of a pressurized water reactor having a plurality of control rod guide tubes. A probe displaceable in the direction of the longitudinal axis of the control rod guide tube is inserted in the interior of at least one control rod guide tube having at least one reference axis, and supported in at least one section of the control rod guide tube on the interior wall thereof, such that the orientation of the at least one reference axis is unambiguously a function of the orientation of the longitudinal axis of the control rod guide tube in the section. The orientation of the at least one reference axis in the section of the control rod guide tube is determined relative to the orientation of the or a further reference axis of the probe in a different section.

21 Claims, 5 Drawing Sheets

U.S. PATENT DOCUMENTS

| | | |
|---|---|---|
| 6,549,600 B1 | 4/2003 | Beier et al. |
| 6,879,653 B2 * | 4/2005 | Arias et al. .................. 376/252 |
| 7,139,353 B2 * | 11/2006 | Smith ........................... 376/233 |
| 7,577,229 B2 * | 8/2009 | Chambrin et al. ............ 376/364 |
| 7,668,282 B2 * | 2/2010 | Stabel et al. ................. 376/267 |
| 7,680,319 B2 * | 3/2010 | Mahe ............................ 382/141 |
| 7,769,125 B2 * | 8/2010 | Yoon et al. .................... 376/442 |
| 2004/0022344 A1 * | 2/2004 | Stabel et al. ................. 376/260 |
| 2011/0013012 A1 * | 1/2011 | Hummel et al. ................ 348/81 |

FOREIGN PATENT DOCUMENTS

| | | |
|---|---|---|
| DE | 100 07 936 A1 | 8/2001 |
| EP | 0 059 301 A2 | 9/1982 |
| FR | 2 754 053 A | 4/1998 |
| GB | 1 525 299 A | 9/1978 |
| JP | 10282286 A | 10/1998 |
| JP | 10300413 A | 11/1998 |
| JP | 3469029 B2 | 11/2003 |
| JP | 3600400 B2 | 12/2004 |

OTHER PUBLICATIONS

International Search Report of PCT/EP2010/067073, Dated Mar. 23, 2011.

* cited by examiner

METHOD AND DEVICE FOR ASCERTAINING THE DEFORMATION OF A FUEL ASSEMBLY IN A PRESSURIZED-WATER REACTOR

CROSS-REFERENCE TO RELATED APPLICATION

This is a continuation application, under 35 U.S.C. §120, of copending international application No. PCT/EP2010/067073, filed Nov. 9, 2010, which designated the United States; this application also claims the priority, under 35 U.S.C. §119, of German patent application No. DE 10 2009 046 665.7, filed Nov. 12, 2009; and No. DE 10 2009 047 760.8, filed Dec. 9, 2009; the prior applications are herewith incorporated by reference in their entirety.

BACKGROUND OF THE INVENTION

Field of the Invention

The invention relates to a method and a device for ascertaining the deformation of a fuel assembly in a pressurized-water reactor.

The fuel assemblies in a pressurized-water reactor can, in the course of their operation and depending on their position in the core, undergo deformation, which substantially consists of bending and can in the worst case lead to the control rods being difficult to move or to problems during fuel-assembly exchange. When inspecting fuel assemblies, it is therefore necessary for the deformation of such a fuel assembly to be determined quantitatively in order to be able to decide on their further usability or in order to place them, as is proposed for example in international patent disclosure WO 02/095765 A2, corresponding to U.S. Pat. No. 7,668,282, at the edge of the core with an orientation such that the maximum bending is located on the outside of the core in order to reduce any bending in this manner.

SUMMARY OF THE INVENTION

The invention is therefore based on the object of specifying a method for measuring the deformation of a fuel assembly in a pressurized-water reactor, with which method the deformation of the fuel assembly can be measured simply with a high degree of measurement accuracy and at the same time with little time expenditure. In addition, the invention is based on the object of specifying a device operating according to this method.

Accordingly, in a method for measuring the deformation of a fuel assembly in a pressurized-water reactor having a plurality of control-rod guide tubes, a probe which is displaceable in the direction of the longitudinal axis of the control-rod guide tube is inserted into the interior of at least one control-rod guide tube. The probe has at least one reference axis and is supported in at least one section of the control-rod guide tube against its inner wall such that the orientation of the at least one reference axis uniquely depends on the orientation of the longitudinal axis of the control-rod guide tube in this section. The orientation of the at least one reference axis in the section of the control-rod guide tube relative to the orientation thereof or of another reference axis of the probe in another section is ascertained.

The starting point of the invention is the consideration that the form of a control-rod guide tube in a fuel assembly in a pressurized-water reactor directly reflects the form of the fuel assembly due to the fact that the control-rod guide tube is a supporting structural part of the fuel assembly.

With the method or the device according to the invention it is possible to measure the deformation or bending of a fuel assembly with a high degree of accuracy quickly and simply even when the fuel assembly is not exactly aligned in the vertical, so that it is not necessary to introduce the fuel assembly into measurement stations of complicated construction. Moreover the measurement can also be carried out under unfavourable illumination conditions which typically make photogrammetric measurement carried out in such measurement stations more difficult.

A reference axis is an axis which is fixed inside the probe and has, when the probe is inserted into the control-rod guide tube, a unique angular relationship with respect to a straight line, which approximately reflects the extent of the longitudinal axis in the section of the control-rod guide tube in which the probe is supported thereon.

A unique relationship between the position of the at least one reference axis and the orientation of the longitudinal axis of the control-rod guide tube can be achieved simply if supporting devices are arranged on the circumference of the probe which are radially deployable perpendicular to its central axis, can be supported against the inner wall of the control-rod guide tube and align the probe in the control-rod guide tube such that their central axis in the respective section is at least approximately parallel to the longitudinal axis of the control-rod guide tube. The feature "parallel to the longitudinal axis" should be understood within the meaning of the present application such that the central axis is aligned parallel to a straight line which is approximated to the actual extent of the longitudinal axis in this section, for example a tangent on the longitudinal axis in this section.

If an inclinometer for determining the inclination of the central axis of the probe with respect to the vertical is provided as the measuring device for determining the orientation of the at least one reference axis in a section relative to the orientation of the reference axis in another section, the deformation of the control-rod guide tube can be ascertained with a unipartite rigid probe.

In a further configuration of the invention, the measuring device for determining the inclination contains a pendulum which is supported such that it swings freely inside the probe and whose deflection relative to the central axis is measured. This makes it possible with little design outlay to directly measure simply and precisely the inclination of the central axis of the probe with respect to the vertical.

In a further configuration of the invention, the measuring device for determining the deflection contains a distance measuring device for measuring a spacing between a pendulum body of the pendulum and at least one reference point which is arranged to be positionally fixed in the probe. In this manner a high degree of measurement accuracy can be attained with commercially available distance sensors.

In order to ascertain the local deformation of the fuel assembly, i.e. the local direction of the tangent located on the longitudinal axis of the control-rod guide tube in space, i.e. the deflection and orientation of the pendulum plane or the deflection of the pendulum body in two directions, at least two distance measuring devices are provided in the measuring device, with which distance measuring devices the distance between the pendulum body and two spaced-apart reference points arranged in the probe can be measured.

In a particularly preferred configuration of the invention, as the distance measuring device, a contactlessly operating eddy-current displacement transducer is provided which is arranged in particular to be positionally fixed in the probe.

In an alternative configuration of the invention, the measuring device for determining the inclination contains at least one level, in whose level capsule a gas bubble or a floating body, which is suspended moveably in the level capsule and whose specific weight is less than the specific weight of the level liquid in the level capsule, is located as the level eye. Arranged in the region of the level is at least one coil, whose inductance is dependent on the position of the level eye. Such an arrangement enables a particularly compact design of the device.

In one advantageous configuration the level provided is a tube level around which two electrical coils with mutually facing end faces are wound.

A high degree of measurement sensitivity is achieved if the coils are switched as a half bridge of a Wheatstone bridge.

Alternatively, the coils can also be configured as secondary coils in a differential transformer.

In one particularly preferred configuration of the invention, the probe is constructed from at least two partial probes, which are arranged one behind the other in the longitudinal direction and are coupled together such that they are pivotable about two axes which are perpendicular to each other and to the central axes of the partial probes. Each of the partial probes has a reference axis and the partial probes are supported, in spaced-apart sections of the control-rod guide tube against its inner wall, such that the orientation of the reference axes is uniquely dependent on the orientation of the longitudinal axis of the control-rod guide tube in the respective sections of the control-rod guide tube. In the probe a measuring device for determining the orientation of the reference axes relative to one another is arranged.

An advantage of such a device having at least two parts is that the two partial probes are located in spaced-apart sections of the control-rod guide tube, such that a curvature of the control-rod guide tube can be captured by a measuring device which is capable of measuring the relative orientation of the relative reference axes. This can be, for example, an optical measuring device, in which in one partial probe a light beam is generated which travels along an axis—the reference axis, for example the central axis of the partial probe—toward the other partial probe and in the other partial probe strikes a receiver, with which, with a given distance between receiver and light source, the position of the incident light beam can be captured, on the basis of which the angle at which the light beam travels relative to a reference axis of the other partial probe, for example likewise its central axis that is perpendicular to the receiver plane, is determined.

In this two-part or multipart arrangement, supporting devices are likewise arranged on the circumference of each partial probe which are deployable perpendicular to the central axis and can be supported against the inner wall of the control-rod guide tube and align the partial probe in the control-rod guide tube such that its central axis in the regions of the supporting devices extends at least approximately parallel to the longitudinal axis of the control-rod guide tube in the respective section.

If the partial probes are coupled to each other via a universal joint, the pivotability of the partial probes with respect to one another is particularly smooth.

If, as the measuring device, a bending element is provided, which is provided with at least one strain sensor and is clamped between the partial probes, a particularly low susceptibility to failure is ensured with little design outlay even under difficult conditions of use.

High measurement sensitivity is achieved here if the bending element contains a bending beam having a square cross section, which bending beam is fixed on one side in one of the partial probes and the free end of which is connected in a force-fitting manner to an actuation rod, the free end of which comprises a ball mounted in a sliding manner in the other partial probe.

In one particularly advantageous configuration at least two flat faces of the bending beam which are perpendicular to one another are provided with a strain sensor, preferably a strain gauge, in order to be able to detect the deformations in two directions which are perpendicular to each other and to the longitudinal axis of the control-rod guide tube.

If in particular each flat face of the bending beam is provided with a strain gauge and the mutually opposite strain gauges are switched as a half-bridge of a Wheatstone bridge, the measurement sensitivity is increased.

The forward motion of the probe inside the control-rod guide tube is facilitated if, as the supporting devices, guide rolls or balls are provided which roll along the inner circumference of the control-rod guide tube during axial forward motion.

Other features which are considered as characteristic for the invention are set forth in the appended claims.

Although the invention is illustrated and described herein as embodied in a method and a device for ascertaining the deformation of a fuel assembly in a pressurized-water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 1, 2:
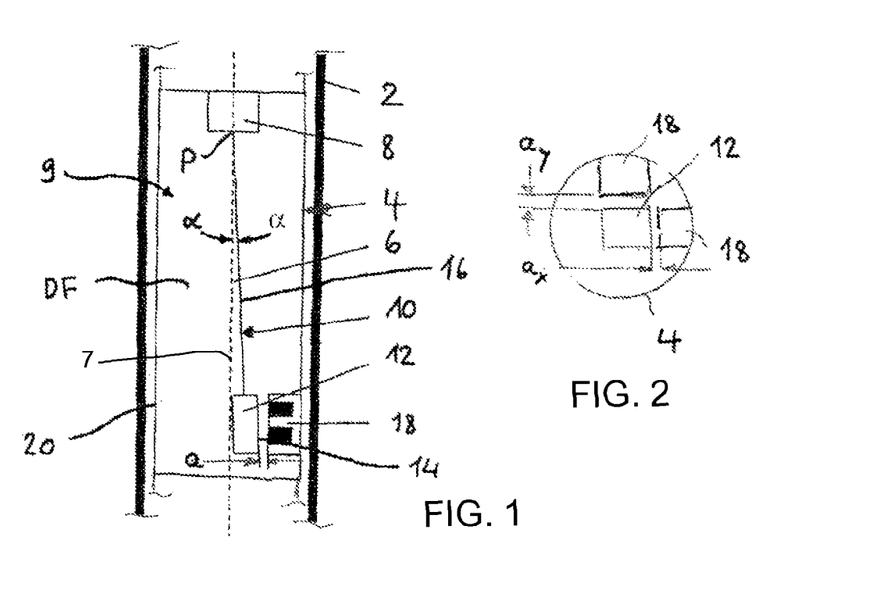
FIG. 1 is a diagrammatic, side view of a device according to the invention which is inserted into a control-rod guide tube.
FIG. 2 is an illustration of the device in a simplified cross section perpendicular to its central longitudinal axis.

Referring now to the figures of the drawing in detail and first, particularly, to FIG. 1 thereof, there is shown a device according to the invention which contains a probe 4 which is insertable into an interior of a control-rod guide tube 2. The probe 4 is arranged centrically in the control-rod guide tube 2 using non-illustrated supporting devices such that its central axis 6, which serves as a reference axis, at least approximately coincides, in a section of the control-rod guide tube 2 defined by the supporting devices, with its longitudinal axis 7 or is at least approximately parallel to a tangent touching the longitudinal axis 7 in this section. Here, the axial dimensions of the probe 4 are so small that a curvature of the longitudinal axis of the control-rod guide tube resulting from a deformation of the control-rod guide tube which occurs in practice in the region of the probe 4 is practically negligible and is not illustrated in the drawing for reasons of clarity.

An inclinometer or inclination sensor is arranged in the probe 4 as the measuring device 9, with which inclinometer it is possible to determine an inclination of the central axis 6 with respect to the vertical. In the example illustrated, a measuring device 9 contains a pendulum 10, which is suspended in a pendulum suspension device 8 such that it swings freely, i.e. can swing in all vertical planes with any desired azimuth angles, the position of which pendulum 10 indicates the direction of the vertical. The pendulum suspension device 8 is arranged centrally in the probe 4 such that the suspension point P of the pendulum 10 is located on the central axis 6.

It is clear in the figure that the pendulum 10 is aligned such that it is inclined with respect to the central axis 6 by the inclination angle α and that therefore the longitudinal axis of the control-rod guide tube 2 is orientated at an angle to the vertical at the measurement site, i.e. in the section of the control-rod guide tube 2 in which the probe 4 is supported against the inner wall of the control-rod guide tube 2.

Located at the free end of the pendulum 10 is a pendulum body 12 having at least one planar flat face 14, the normal of which is orientated perpendicular to the pendulum arm 16. Arranged in a positionally fixed manner opposite the flat face 14 is a distance measuring device 18 inside the probe 4, with which distance measuring device 18 the spacing a between the pendulum body 12, i.e. the flat face 14 of the pendulum body 12, and a reference point which is arranged to be positionally fixed in the probe 4, is measured.

For better illustration, the inclination angle α is plotted in an exaggerated fashion in the figure such that the planar flat face 14 extends such that it is inclined, likewise noticeably, with respect to the planar flat face of the distance measuring device. In practice, however, this inclination angle α is so small that this inclination is negligible within the required measurement accuracy.

A contactlessly operating eddy-current displacement transducer is provided as the distance measuring device 18. With this eddy-current displacement transducer a spacing "a" to the flat face 14 of an electrically conductive pendulum body 12 is contactlessly detected. The inclination angle α and the spacing a are linked by a linear relationship for small inclination angles α. In this manner, the inclination angle α of the tangent on the longitudinal axis of the control-rod guide tube 2 can be measured in different axial positions and thus the curved profile of the longitudinal axis of the control-rod guide tube 2 can be measured.

Pendulum 10 and distance measuring device 18 are arranged inside an encapsulated housing 20, which is preferably filled with a fluid DF for damping the pendulum 10.

In order to detect the position of the pendulum arm 16 in space, according to FIG. 2 two distance measuring devices 18 are arranged inside the probe 4 in positions which are offset with respect to each other by 90°. With these distance measuring devices 18 two spacings $a_x$ and $a_y$, and therefore the deflection of the pendulum body 12 in two mutually orthogonal directions are measured so that the spatial position of the pendulum axis, i.e. of the azimuth angles of the pendulum plane and the deflection of the pendulum in this pendulum plane can be detected. In this manner it is also possible to detect torsion of the control-rod guide tube 2 without any need for another measurement using the probe 4 which is rotated by 90°.

The orientation of the central axis 6 of the probe 4 is measured sectionally in different axial positions or axial sections inside the control-rod guide tube 2. On the basis of the measurement values obtained in different axial sections, it is possible to ascertain the profile of the longitudinal axis 7 of the control-rod guide tube 2, i.e. the deformation thereof. It is also possible to measure the deformation if the control-rod guide tube 2 is aligned such that it is not exactly vertical. In the case of a control-rod guide tube 2, which is for example not deformed and is aligned at an angle to the vertical, for example the measurement values, which are the same in every measurement position, for the inclination angle a would indicate the absence of a curvature.

Figures 3, 4:
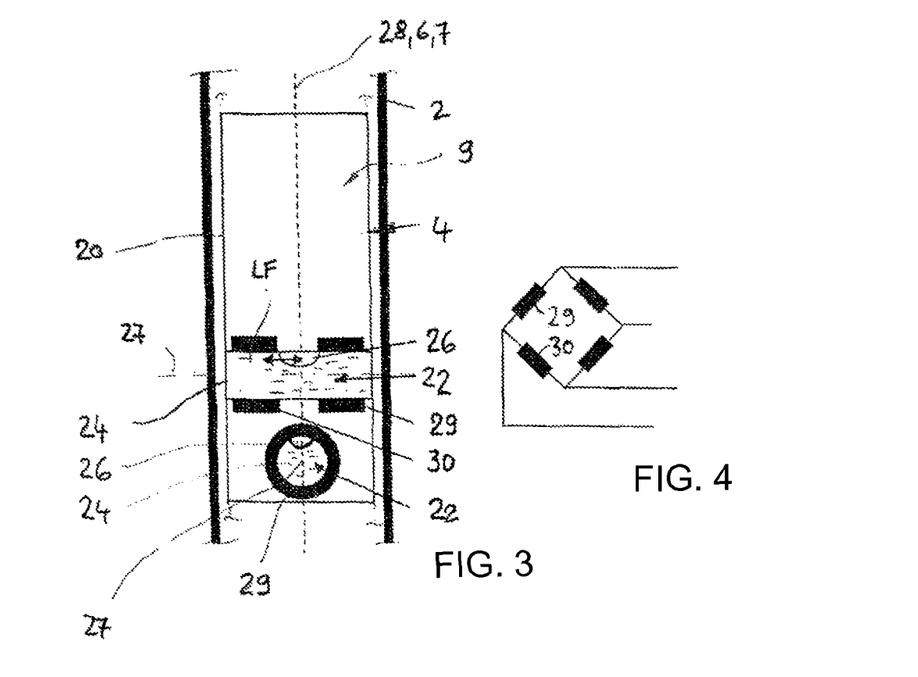
FIG. 3 is a diagrammatic, side view of an alternative embodiment according to the invention, in which a level which is provided with measuring coils is provided as the measuring device.
FIG. 4 is a simplified illustration of the wiring of the measuring coils used in the embodiment of FIG. 3.

In the alternative configuration according to FIG. 3, the measuring device 9 for determining the inclination of the central axis 6 or of the longitudinal axis 7 with respect to the vertical contains two levels 22 which are arranged in a transducer housing 20. In the example, these levels are tube levels having a substantially (the necessary curvature is not taken into consideration in the schematically simplified illustration) cylindrical level capsule 24, in the level liquid LF of which a gas bubble floats as a level eye 26 in the example, the magnetic properties of which gas bubble differ from the magnetic properties of the level liquid LF. Wound around each level capsule 24, symmetrically to a central plane 28 which is orientated perpendicular to its cylindrical axis 27, are two coils 29, 30 of identical construction, which are substantially (if the curvature of the level capsules 24 is not taken into consideration) coaxial with respect to one another and the end faces of which face one another. In the illustrative example, the central longitudinal axis 6 of the probe 4 is located in the central plane 28.

The position of the level eye 26, which is located in each case inside the level capsule 24, depends on the inclination of the central axis 6 at the measurement location, i.e. at the location of the level capsule 24. If the orientation of the central axis 6 deviates from the vertical, the level eye 26 is no longer situated centrally between the coils 29 and 30. This results in a change in inductances of the coils 29 and 30. This change in inductance can be measured simply if the coils 29, 30 are switched as a half-bridge of a Wheatstone bridge, as is illustrated in FIG. 4. Here it is advantageous, although not absolutely necessary, that the coils 29, 30 in a central position of the level eye 26 have the same inductance.

As an alternative to the illustrated embodiment, it is also possible to use a circular level instead of two tube levels, on which for example four flat coils are arranged.

Instead of the embodiment illustrated in FIG. 3 with two coils 29, 30, which are switched as a half-bridge of a Wheatstone bridge, it is also possible for the coils 29, 30 to be switched as a secondary coil of a differential transformer, so that the difference in the voltages measured in both secondary coils directly represents a measure of the position of the level eye 26.

Alternatively to a gas bubble, as the level eye 26, it is also possible for a floating body suspended inside the level capsule 24 to be arranged, the specific weight of which is less than the specific weight of the level liquid 25 in the level capsule 24. If such a floating body is used, ferritic materials can be used, with which the measurement sensitivity is increased.

Figure 5:
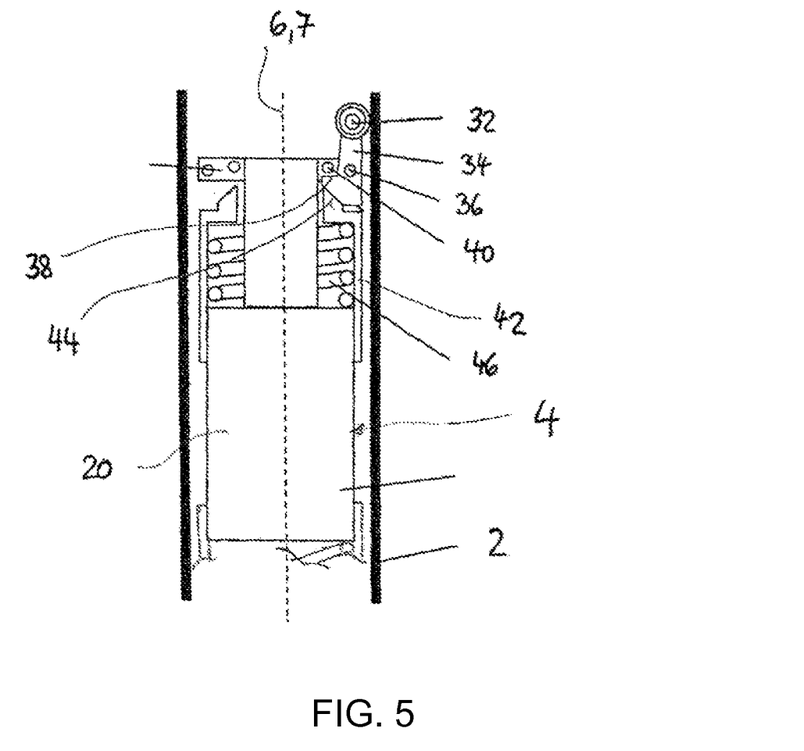
FIG. 5 is a diagrammatic, side view of an advantageous configuration of a supporting device used for a probe according to the invention for centering the probe inside the control-rod guide tube.

In the illustration according to FIG. 5 it can be seen that the probe 4 has on its end faces, i.e. on both sides of the transducer housing 20, a supporting device 32 which is supportable against the inner wall of the control-rod guide tube 2, wherein for reasons of clarity of the illustration only one supporting device 32 on one of the end faces of the probe 4 is illustrated. In the example, the supporting device 32 is a guide roll, which is mounted via a bent lever 34 around a pivot shaft 36 which runs perpendicular to the central longitudinal axis 6 of the probe 4. The bent lever 34 is provided with a shoulder 38, which delimits the pivot path of the supporting device 32 using a stop 40 arranged at the mounting element of the bent lever 34. Arranged on the probe 4 is a hollow cylindrical slide 42 which is mounted movably in the direction of the central longitudinal axis 6 of the probe 4, which slide 42 has a conical end face 44, which cooperates with a surface of the toggle lever 34 which is likewise of an oblique configuration. According to the exemplary embodiment illustrated in FIG. 6, the probe 4 contains two partial probes 4a, 4b, which are arranged one after the other in the longitudinal direction and are coupled to one another pivotably about two axes 50, 52 which are perpendicular to one another and to the central axis 6a, 6b of the partial probes 4a, 4b. In the illustrated example, the control-rod guide tube 2 has a curvature which is plotted in an exaggerated fashion in the drawing plane. Each of the partial probes 4a, 4b is provided with the supporting device 32, with which the partial probes 4a, 4b are aligned in a centered fashion in those sections of the control-rod guide tube 2 which are defined by the supporting device 32, so that their central axes 6a, 6b in this section are approximately parallel to the longitudinal axis 7 or parallel to a tangent located on the longitudinal axis 7 of the control-rod guide tube in the region of the supporting device 32. To this end, the supporting devices 32 are arranged in two planes which are spaced apart in the axial direction of the partial probes 4a, 4b. In the exemplary embodiment, the central axes 6a, 6b at the same time serve as reference axes of the respective partial probes, which are accordingly uniquely dependent on the orientation of the longitudinal axis 7 of the control-rod guide tube 2 in the sections of the control-rod guide tube 2 which are located in each case between the supporting devices 32 of the partial probes 4a, 4b.

Figure 6:
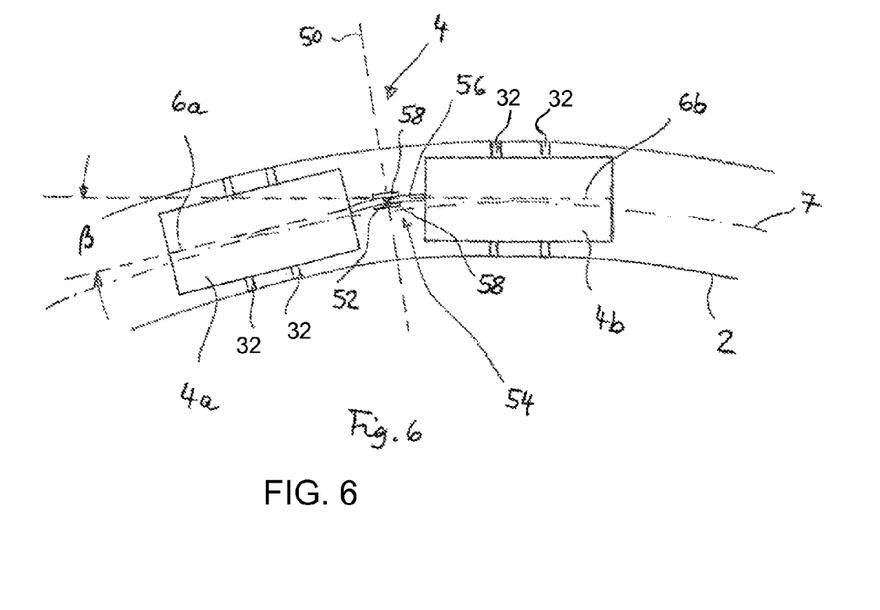
FIG. 6 is a basic diagram of a probe which is designed in two parts.

Arranged in the probe 4 is a measuring device 54, with which the orientation of the reference axes or central axes 6a, 6b relative to one another, i.e. their inclination angles β in the example which is illustrated in a simplified manner with a longitudinal axis 7 which is curved only in one plane (drawing plane), can be measured. In the illustrated simplified exemplary embodiment, the measuring device 54 contains a bending element 56, which is clamped between the partial probes 4a, 4b and the mutually opposite flat sides of which are in each case provided with a strain sensor 58, for example a strain gauge. With these strain sensors 58 the bending of the bending element 56 is detected, which bending represents a measure of the inclination angle R. If the strain sensors 58 are what is referred to as a strain gauge, the resistance of which changes as a function of the strain, the mutually opposite strain gauges are preferably switched as a half-bridge of a Wheatstone bridge.

While in the exemplary embodiments according to FIGS. 1 to 5 measurement is carried out with a unipartite probe 4, in that a measurement signal, which corresponds to the orientation of the longitudinal axis 7 in the respective section, is generated by way of displacement of the probe 4 in spaced-apart sections of the control-rod guide tube 2, in the exemplary embodiment according to FIG. 6 the position of the longitudinal axis 7 in two spaced-apart sections of the control-rod guide tube 2 relative to one another, i.e. directly a measurement value which corresponds to the curvature, is determined using the two partial probes 4a, 4b.

Figure 7:
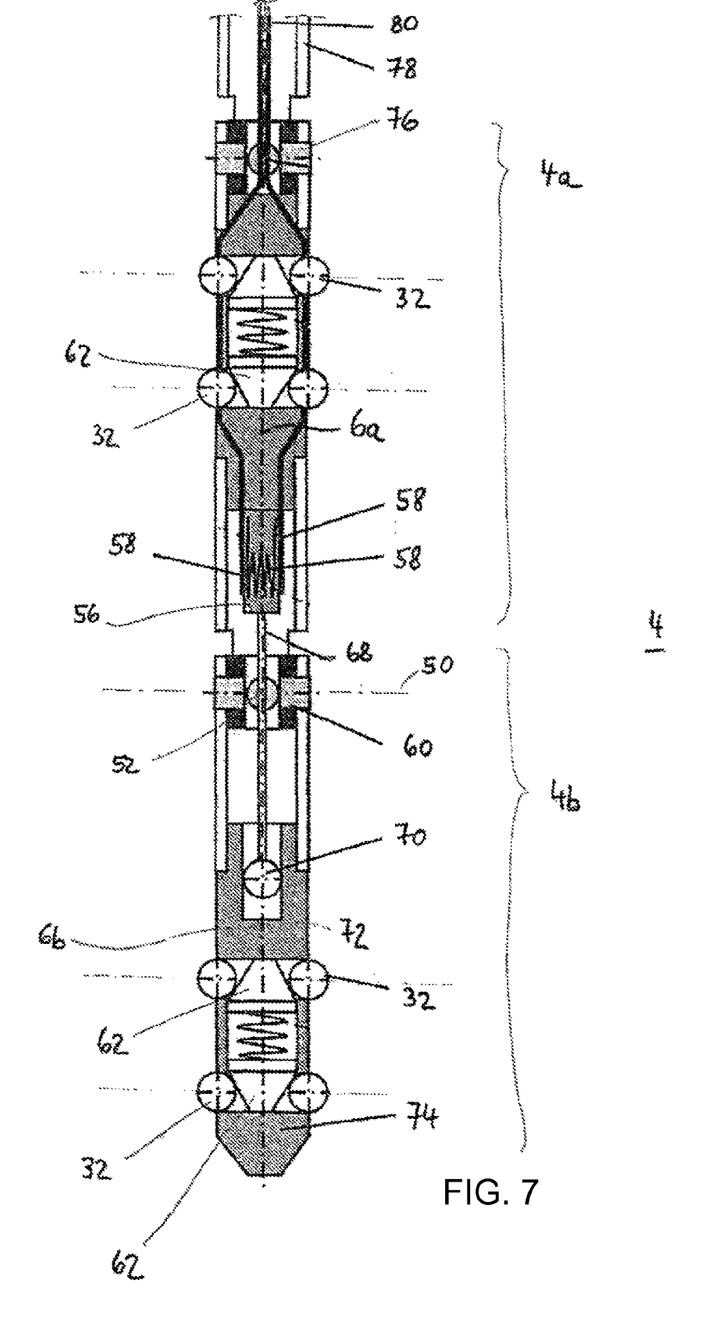
FIG. 7 is a schematic longitudinal section view of a probe according to the invention which is constructed from two partial probes.

According to FIG. 7, the two partial probes 4a, 4b are coupled to one another using a universal joint 60 about the axes 50, 52 which are perpendicular to each other. Each of the two partial probes contains, in two spaced-apart planes which are orientated perpendicular to the respective central axis 6a, 6b, a plurality of supporting devices 32 which are in each case distributed on the circumference. The supporting devices 32 are in the exemplary embodiment in each case four balls, which are pressed radially outwardly via an axially displaceable cone 62 and as a result are supported in a resilient manner against the inner wall of the control-rod guide tube.

As the bending element 56, a cuboid bending beam of square cross section is clamped in the partial probe 4a, which bending beam is provided on each of its flat faces with a strain sensor 58, for example a strain gauge. The end face of the bending beam that faces the adjacent partial probe 4b is rigidly connected to an actuation rod 68, which has at its free end which is remote from the bending beam a ball 70, which is mounted slidably in a socket 72 which is arranged in the partial probe 4b. A conically shaped head part 74 of the partial probe 4b facilitates the insertion of the probe 4 into a control-rod guide tube.

At the end which is remote from the head part 74, the partial probe 4a is hinged to a handling tube via a universal joint 76. This handling tube 78 serves for the forward motion of the probe 4 inside the control-rod guide tube. FIG. 7 additionally also schematically illustrates a measurement cable 80 leading to the strain sensors 58.

If the partial probes 4a, 4b are situated in a curved region of a control-rod guide tube, then each of the partial probes 4a, 4b is aligned in the region of the supporting devices 32 approximately tangentially to the longitudinal axis of the control-rod guide tube using said supporting devices 32. On account of the curvature of the longitudinal axis, the central axes 6a, 6b then extend at an angle β which differs from zero. As a result, the actuation rod 68 mounted in the socket 72 exerts a bending moment onto the bending element 56. It is now possible, by way of the in each case mutually opposite strain sensors 58, to detect the bending of the bending element 56, which is configured as a bending beam of square cross section, in two mutually orthogonal planes. The in each case mutually opposite strain gauges, used as the strain sensors 58, are switched, similar to the example illustrated in FIG. 4, preferably as a half-bridge of a Wheatstone bridge.

Figure 8:
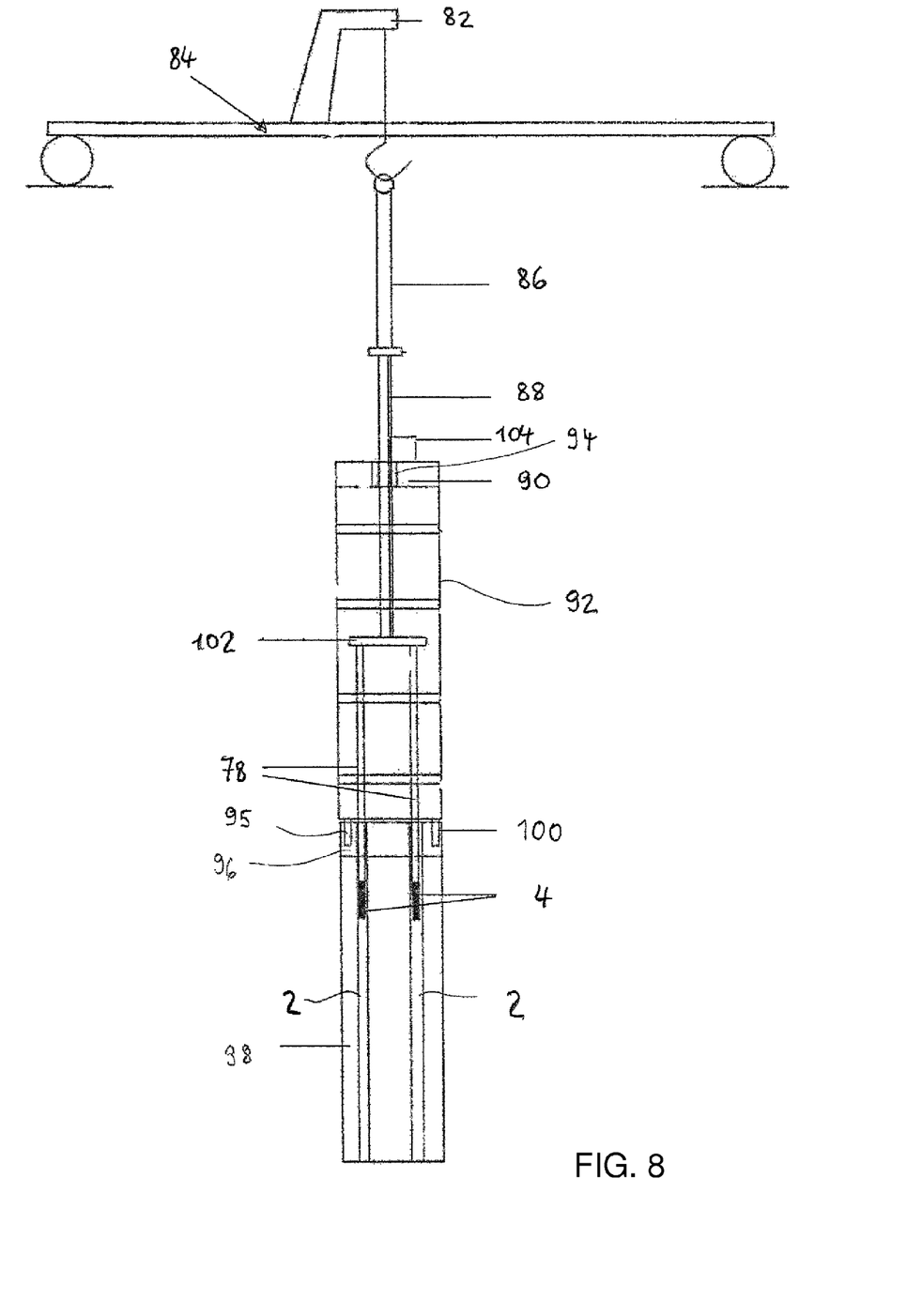
FIG. 8 is an illustration of an apparatus having a plurality of probes for simultaneously measuring the deformation of a corresponding number of control-rod guide tubes in a fuel assembly installed in the core.

According to FIG. 8, the overall apparatus contains a holding bar 86, which is suspended on the crane 82 of a fuel-assembly loading machine 84 and which is provided in its region that is remote from the crane 82 with a tooth rack 88. The tooth rack 88 is guided in a rack guide mechanism 94 arranged at the head part 90 of a guide frame 92. The guide frame 92 is aligned centrically to a fuel assembly 98 using positioning pins 95 in holes 100 arranged at the head 96 of the fuel assembly 98. Arranged at that end of the tooth rack 88 that is remote from the crane 82 is a spider 102, to which a plurality of handling tubes 78 are fixed which at their free ends are provided in each case with a probe 4 according to the invention. With the aid of a displacement transducer 104, which engages on the tooth rack, a displacement signal which corresponds to the current position of the probes 4 within the control-rod guide tubes 2 is detected.

In the schematically illustrated exemplary embodiment, two probes 4 are illustrated. In practice, it has proven particularly expedient to provide the apparatus with four probes 4, which are inserted in four control-rod guide tubes 2 arranged at corner points of the fuel assembly 98.

The invention claimed is:

1. A method for measuring a deformation of a fuel assembly in a pressurized-water reactor having a plurality of control-rod guide tubes, which comprises the steps of:
inserting a probe, being displaceable in a direction of a longitudinal axis of a control-rod guide tube, into an interior of the control-rod guide tube, the probe having at least one reference axis and is supported in at least one section of the control-rod guide tube against an inner wall of the control-rod guide tube such that an orientation of the at least one reference axis uniquely depends on an orientation of the longitudinal axis of the control-rod guide tube in the at least one section, and the orientation of the at least one reference axis in the at least one section of the control-rod guide tube relative to the orientation of the longitudinal axis or of another reference axis of the probe in another section of the control-rod guide tube is ascertained.

2. A device for measuring a deformation of a fuel assembly in a pressurized-water reactor having a plurality of control-rod guide tubes, the device comprising:
a probe to be inserted into an interior of a control-rod guide tube and displaceable in a direction of a longitudinal axis of the control-rod guide tube and having at least one reference axis and is supported in at least one section of the control-rod guide tube against an inner wall of the control-rod guide tube such that an orientation of the at least one reference axis uniquely depends on an orientation of the longitudinal axis of the control-rod guide tube in the at least one section; and
a measuring device, disposed in said probe, for determining the orientation of the at least one reference axis in the at least one section of the control-rod guide tube relative to the orientation of the longitudinal axis or a further reference axis of said probe in another section of the control-rod guide tube.

3. The device according to claim 2, further comprising supporting devices disposed on a circumference of said probe and are radially deployable perpendicular to its central axis, said supporting devices can be supported against the inner wall of the control-rod guide tube and align said probe in the control-rod guide tube such that their central axis in a respective section is at least approximately parallel to the longitudinal axis of the control-rod guide tube.

4. The device according to claim 2, wherein said measuring device is an inclinometer for determining an inclination of the reference axis of said probe with respect to a vertical, the reference axis being a central axis of said probe.

5. The device according to claim 4, wherein said measuring device for determining the inclination contains a pendulum being supported such that said pendulum swings freely inside said probe and whose deflection relative to said central axis is measured.

6. The device according to claim 5, wherein:
said pendulum has a pendulum body; and
said measuring device for determining the deflection contains a distance measuring device for measuring a spacing between said pendulum body of said pendulum and at least one reference point which is disposed to be positionally fixed in said probe.

7. The device according to claim 6, further comprising at least two distance measuring devices for ascertaining the deflection of said pendulum body and an orientation of a pendulum plane, said at least two distance measuring devices measuring a distance between said pendulum body and two spaced-apart reference points disposed in said probe.

8. The device according to claim 7, wherein said distance measuring devices have a contactlessly operating eddy-current displacement transducer.

9. The device according to claim 8, wherein said eddy-current displacement transducer is disposed to be positionally fixed in said probe.

10. The device according to claim 4, wherein said measuring device for determining the inclination contains at least one level having a level capsule with one of a gas bubble or a floating body functioning as a level eye and is suspended moveably in said level capsule and whose specific weight is less than a specific weight of a level liquid in said level capsule, wherein arranged in a region of said level said measuring device further having at least one coil, said at least one coil having an inductance being dependent on a position of said level eye.

11. The device according to claim 10, wherein said level is a tube level around which two electrical coils with mutually facing end faces are wound.

12. The device according to claim 11, wherein said two electric coils are switched as a half-bridge of a Wheatstone bridge.

13. The device according to claim 11, wherein said two electric coils form in each case a secondary coil of a differential transformer.

14. The device according to claim 2, wherein said probe contains at least two partial probes, which are disposed one behind another in the longitudinal direction and are coupled together such that said two partial probes are pivotable about two axes which are perpendicular to each other and to central axes of said two partial probes, wherein each of said two partial probes has a reference axis and said two partial probes are supported, in spaced-apart sections of the control-rod guide tube against the inner wall, such that an orientation of the reference axes is uniquely dependent on the orientation of the longitudinal axis of the control-rod guide tube in the respective sections of the control-rod guide tube, and said probe further having a measuring device for determining the orientation of the reference axes relative to one another.

15. The device according to claim 14, further comprising supporting devices disposed on a circumference of each of said two partial probes which are deployable perpendicular to the central longitudinal axis, can be supported against the inner wall of the control-rod guide tube and align said two partial probes in the control-rod guide tube such that said central axes are at least approximately parallel to the longitudinal axis of the control-rod guide tube.

16. The device according to claim 14, further comprising a universal joint coupling said two partial probes to each other.

17. The device according to claim 14, wherein said measuring device is a bending element having at least one strain sensor clamped between said two partial probes.

18. The device according to claim 17, wherein:
said measuring device has an actuation rod with a free end containing a ball;
said bending element has a bending beam with a square cross section, said bending beam is fixed on one side in a first one of said two partial probes and a free end of said bending beam is connected in a force-fitting manner to said actuation rod; and
said free end of said actuation rod containing said ball mounted in a sliding manner in a second one of said two partial probes.

19. The device according to claim 18, wherein said bending beam contain at least two flat faces being perpendicular to one another and each having a strain sensor.

20. The device according to claim 19, wherein said strain sensor is a strain gauge.

21. The device according to claim 20, wherein each of said flat faces of said bending beam has a strain gauge and mutually opposite strain gauges are switched as a half-bridge of a Wheatstone bridge.

* * * * *